United States Patent [19]
Thiele

[11] 3,770,122
[45] Nov. 6, 1973

[54] FLEXIBLE LAMINATED PACKAGE

[75] Inventor: Guenther Thiele, Munster, Germany

[73] Assignee: Glasurit Werke M. Winkelman GmbH, Hamburg-Wandsack, Germany

[22] Filed: May 14, 1971

[21] Appl. No.: 143,444

[30] Foreign Application Priority Data

| May 16, 1970 | Germany | G 70 18 463.3 |
| May 16, 1970 | Germany | P 20 24 178.5 |
| May 16, 1970 | Germany | P 20 24 179.6 |
| May 19, 1970 | Austria | 4479/70 |
| May 19, 1970 | Austria | 4480/70 |
| May 15, 1970 | Austria | 4400/70 |

[52] U.S. Cl............... 206/84, 161/214, 229/3.5 MF
[51] Int. Cl............................................. B65d 81/00
[58] Field of Search........................ 161/214, 227; 206/46 R, 84; 229/3.5 R, 3.5 MF

[56] References Cited
UNITED STATES PATENTS

| 3,381,818 | 5/1968 | Cope et al. | 206/84 |
| 3,630,826 | 12/1971 | Rose | 161/227 X |
| 3,570,748 | 3/1971 | Coyle et al. | 229/3.5 R |
| 3,288,664 | 11/1966 | Hoppe | 161/214 X |
| 3,582,458 | 6/1971 | Haller | 161/214 X |
| 3,454,210 | 7/1969 | Spieger et al. | 229/3.5 R X |
| 3,661,677 | 5/1972 | Wang | 161/227 X |

FOREIGN PATENTS OR APPLICATIONS

| 1,550,947 | 12/1968 | France | 229/3.5 MF |

Primary Examiner—Samuel B. Rothberg
Assistant Examiner—Steven E. Lipman
Attorney—Krafft & Wells

[57] ABSTRACT

A flexible laminated package for highly viscous or pasty compositions containing organic solvents, wherein the package has a first multi-layer laminate and a second multi-layer laminate, each of which laminates are composites of at least two joined films wherein the inner film which is in direct contact with the viscous or pasty compositions is a polyalkylene film and the outer film is a polyamide and the multi-layer laminates are heat sealed at the edges.

7 Claims, 7 Drawing Figures

PATENTED NOV 6 1973 3,770,122

INVENTOR:
GUENTHER THIELE
BY: Krafft & Wells

FLEXIBLE LAMINATED PACKAGE

BACKGROUND OF THE INVENTION

The field of the invention is non-structural laminates of polyamide next to polymers of unsaturated monomers.

It is conventional to employ laminates of a synthetic resin or aluminum, in the form of compound plastic films or bonded aluminum foils, as wrapping material for dry, solid or pulverulent substances to be packaged, and for bags for the storage of moist, aqueous, or oil-containing products. One broad range of application is the packaging of foodstuffs. In general, the procedure followed is to heat seal the film into bags, with the aid of a suitable packaging machine, then to fill in the material to be packaged, and thereafter to seal the bag in an airtight manner by another heat sealing process.

It is known to combine plastic films with aluminum foils for these packaging purposes, wherein the aluminum foil protects the charged material on the outside from the effects of light and heat and wherein, at the same time, a direct contact between the metallic foil and the filled-in material is avoided. In addition to the drug industry, a wide range of applications is the packaging of foodstuffs and detergents.

The state of the art of flexible laminated food packages may be ascertained by reference to U.S. Pat. No. 3,556,816 of Nughes, dated Jan. 19, 1971 and the state of the art of polyamide films bonded to polyolefin films may be ascertained by reference to U.S. Pat. No. 3,423,231 of Lutzmann dated Jan. 21, 1969. The state of the art of polyamides may be ascertained by reference to Kirk-Othmer "Encyclopedia of Chemical Technology, 2nd Ed., Vol. 16 (1968), pages 1–46, particularly page 24 (Nylon 6—6), page 32 (Nylon 6), page 34 (Nylon 3), page 35 (Nylon 4), page 36 (Nylon 7), page 37 (Nylon 8) and page 38 (Nylons 9, 10 and 11). The physical and chemical properties and methods of making the olefin polymer films useful in the present invention are disclosed in Kirk-Othmer, Vol. 14, (1967), pages 217–313, particularly page 242 (high density polyethylene), page 259 (polyethylenes made by the Ziegler process), page 282 (polypropylene), and page 312 (polyisobutylene, poly-1-butene and poly-4-methyl-1-pentene). The state of the art of film materials such as cellophane, polyethylene, polypropylene and nylon may be ascertained by reference to Kirk-Othmer, Vol. 9 (1966), pages 220–244, particularly pages 228, 229 and 231. The Modern Plastics Encyclopedia of 1966, published by McGraw Hill discloses, at pages 978–982, the welding of plastic films, such as used in the present invention, by heat sealing by conduction, impulse, dialectric and ultrasonic welding.

The composite films employed heretofore and the packages produced therefrom are not in all cases diffusion-proof, so that in the case of packaged materials containing solvents the material in the package can become useless due to the diffusion of the solvent into the atmosphere. This is especially applicable to pasty materials, such as, for example, mastic compositions which become completely thickened by diffusion evaporating. For this reason, it has previously been impossible to package, for example, mastic compositions into bags of composite films. Rather, such compositions containing organic solvents had to be packaged heretofore into metallic containers, cans, or sheet metal drums. This type of packaging has disadvantages because commercially available rimless sheet metal cans do not seal the contents tightly enough, so that an evaporation can occur. Therefore, the packaged material must additionally be covered by a film and, in part, also with so-called pellicle-preventing agents. After the opening of the cans and partial removal of the material therefrom, the leakproofness is still further reduced upon the subsequent reclosing of these cans so that, in due course of time, there is the formation of a pellicle and a thickening of the packaged material occurs which, without fail, results in spoilage of the material. Furthermore, the proportion of the expense for packaging as compared to the cost of the filling material is so high that the costs for the packaged goods becomes disadvantageously high.

SUMMARY OF THE INVENTION

Having in mind the limitations of the prior art, it has now been found, surprisingly, that the above-described disadvantages do not occur in the case of a package sealed all around in a film cushion form obtained by means of heat sealing of multiple-layer laminates formed into bags and filled with viscous, particularly highly viscous or pasty compositions containing organic solvents, especially mastic compositions or putty-like masses, by using a conveying and dispensing machine, characterized in that the multiple-layer laminates employed are composite films of at least two bonded-together individual films, wherein the inner film in direct contact with the filled composition is a polyalkylene film and the film arranged therebehind is a polyamide film.

The individual films utilized as the starting materials for the composite film employed according to this invention are available commercially and are known. Polyalkylene films are understood to mean films of alkylene polymers with a straight or branched chain, such as, for example, films of high pressure or low pressure polyethylene, or of polypropylene, polyisopropylene, polybutylene and polyisobutylene.

Such a package produced in accordance with the present invention is suitable, for example, for the filling and packaging of mastic compositions based on unsaturated polyesters and polymerizable monomers.

Further embodiments of the present invention include one or more protective casings, imprints or coats applied to the package formed by the two above-disclosed films.

Finally, the invention relates to an all-around closed package of plastic films in cushion form obtained by the heat sealing of multiple-layer laminates formed into bags and filled with viscous, particularly viscid or highly viscous, pasty compositions containing organic solvents, especially mastic compositions or putty-like masses. This cushion package is characterized in that the inner film is poly-alkylene and the outer film is a polyamide. Additionally, a further film, preferably aluminum foil, is provided, the outside of which is protected by a further film or another coating.

The invention furthermore has the object of providing a possibility for packaging highly viscous or pasty compositions containing organic solvents in such an economical fashion that the packaged goods do not become too expensive due to the costs involved in the packaging thereof and that, on the other hand, the packaged material can also be stored over longer periods of time without spoiling of the material due to the escape or diffusion of the organic solvents.

The object of this invention is attained by employing a packaging process characterized in that the dispensing unit is followed by a packaging machine wherein a composite plastic film consisting of at least one film sheet is formed into a tube, filled, and separated into sealed individual bags. One film of the composite film is diffusion-proof with respect to the material contained therein as a result of the chemical properties of this film, whereas the other film, due to its chemical properties, is well suitable for heat sealing.

In accordance with the invention, the readily heat sealable film is heat sealed, either:

a. by a high frequency current,
b. by means of a welding mechanism operated ultrasonically,
c. by thermal electricity at a relatively low temperature, or
d. by means of a heat sealing plant operated with a liquid or gaseous medium producing the heat sealing temperature.

By employing these process features, the objective is attained that a composite film is used, which is formed from at least two sheets of film, one film of the composite being extensively diffusion-proof with respect to the material filled therein, due to the chemical properties of the film, and the other film, due to its chemical properties, being well suitable for heat sealing, so that the film can be heat sealed even at relatively low temperatures. By the use of low heat sealing temperatures, it is possible to heat seal plastic films even in the case of goods containing organic solvents which are explosive. This has not been feasible heretofore. However, on the other hand, an object is simultaneously achieved whereby the packaged bag finally produced surrounds the filled-in material in a substantially diffusion-proof manner, although a heat sealable plastic film is employed.

BRIEF DESCRIPTION OF THE DRAWINGS

The subject matter of the present invention may best be described by reference to the accompanying drawings, wherein.

Figure 1:
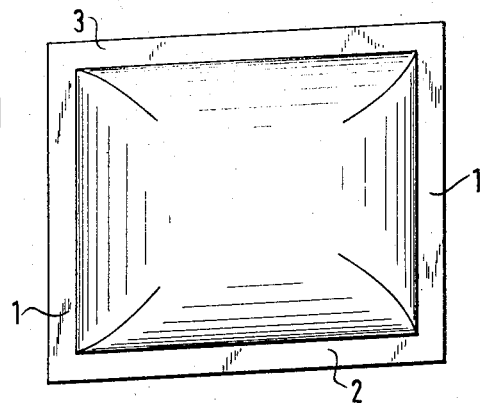
FIG. 1 is a plan view showing a package of the present invention with four sides thereof heat sealed.
Figure 2:
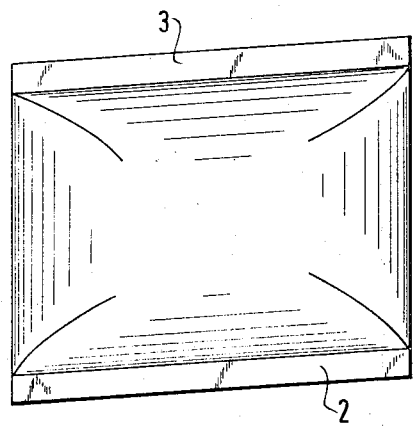
FIG. 2 is a plan view of a package of the present invention showing two sides of the package heat sealed.
Figure 3:
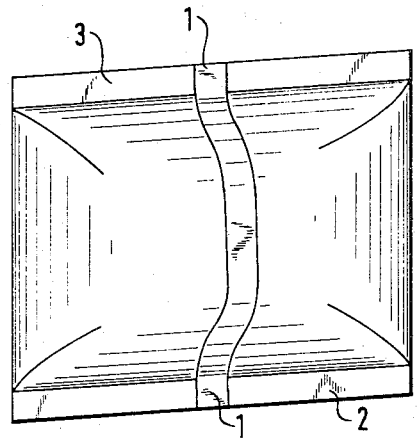
FIG. 3 is a plan view of the present invention showing the package with two sides heat sealed and a transverse heat sealed edge.

The cushion package proper, shown in FIGS. 1-3 of the appended drawings, is formed from one or two composite film sheets, which latter are placed around appropriate shaping tools and, preferably further conveyed in a continuous manner, are formed into a tube by means of a heat sealing seam, denoted by 1. The material to be packaged is filled into this tube at the top thereof, the tube being closed at its lower end by a welding seam 2; after the desired charging quantity is obtained, this bag formed in the manner explained above is sealed by a third welding seam 3. In this connection, the preferred procedure followed is to produce during the production of the welding seam 3 simultaneously the welding seam 2 for the subsequent bag to be filled. Such a mode of operation is generally conventional.

Figures 4, 5:
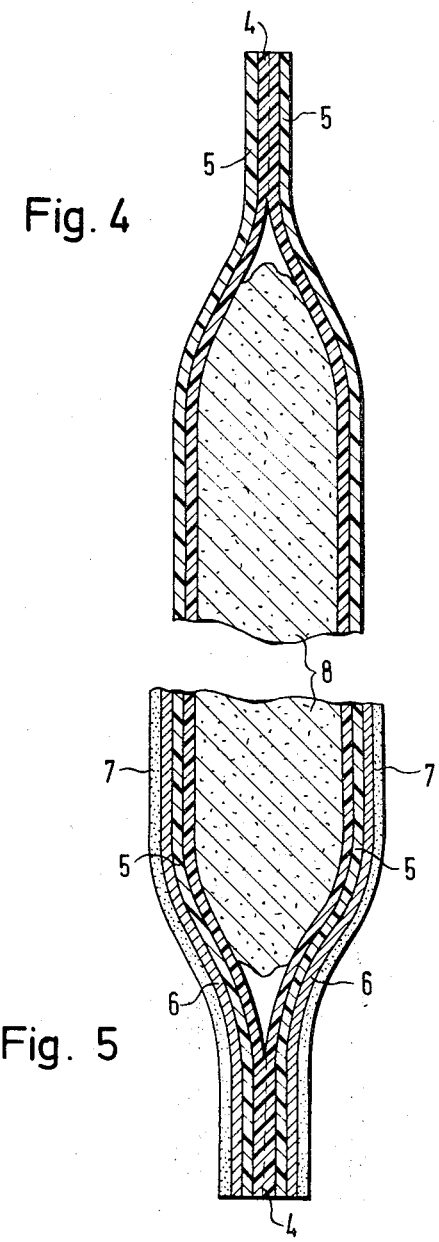
FIG. 4 is a cross-sectional view of the package of the present invention showing a two layer laminated film.
FIG. 5 is a cross-sectional view of a four layer laminated film.

According to the invention, the bag wall consists of bonded, firmly connected plastic films, denoted in FIGS. 4 and 5 by numerals 4 and 5. In the illustrated embodiment, the material 8 filled therein represents a viscid, viscous or pasty composition containing organic solvents. In case of such a filling material, the inner film 4 preferably consists of polyethylene which can be heat sealed, as is known, readily and at relatively low temperatures, namely at temperatures of between 100° and 140° C. However, this polyethylene film is not diffusion-proof, so that the organic solvents contained in the filling material 8 could diffuse and thus the filling material would spoil after a corresponding storage period. In order to prevent this from happening, the film 5 is made of polyamide which is substantially diffusion-proof, but which cannot be readily heat sealed under certain conditions. During the heat sealing operation conducted on the bag to be sealed at the top, the two films 4 are now firmly sealed to each other, namely at a temperature at which the heat sealing step can also be carried out without danger in spite of the organic solvents present therein.

Additional films can be applied to the film 5, which additional films serve for further purposes, for example an aluminum foil 6 which can likewise be used as the diffusion coating but which can also be simultaneously provided for the purpose of protecting the filled-in material from light or heat radiation. It is obvious that it is possible to apply further films or layers 7 to the film 6 in order to solve any other problems; for example, appropriate varnishes, imprints, or the like can be provided.

The invention, of course, is not limited to the illustrated embodiments, rather, modifications thereof are possible without departing from the basic concept of this invention.

Figure 6:
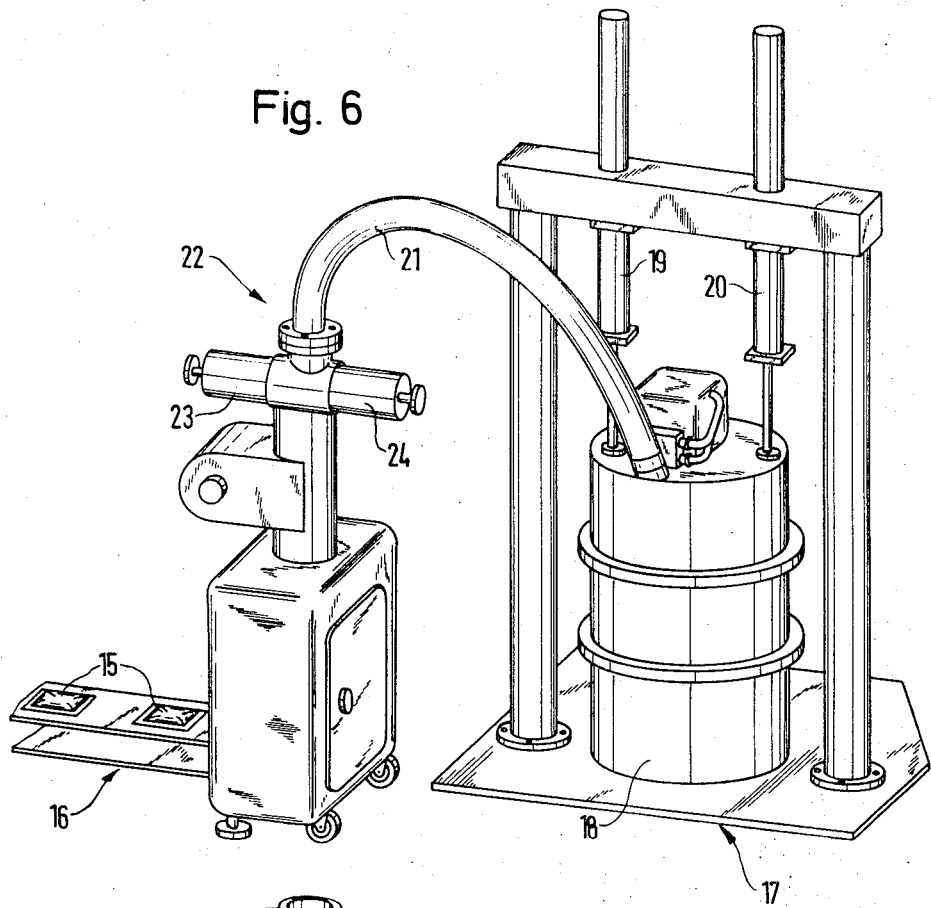
FIG. 6 is an elevational view of the apparatus of the present invention for filling and sealing packages.

An embodiment of an apparatus suitable for conducting the process is explained in the description set out below with reference to the drawing. In the drawing:

In FIG. 6, the numeral 17 denotes a so-called conveying mechanism for highly viscous and pasty masses, consisting, for example, of a storage tank 18 containing the composition to be packaged. After removal of the lid, a pressure plate is placed on this storage tank, which plate is pressed downwardly into the tank by the two piston rams 19 and 20; however, this pressure plate has an outlet opening through which the compressed mass can now be discharged, so that this mass can pass to the dispensing unit 22 proper via a conducting hose 21.

The dispensing unit can be constructed in a conventional manner, and in the illustrated embodiment two oppositely working pressure cylinders 23 and 24 are provided which successively conduct the dispensing of the composition fed via the hose 21 and feed this metered composition to the bags proper via a guiding and filling pipe 9.

Figure 7:
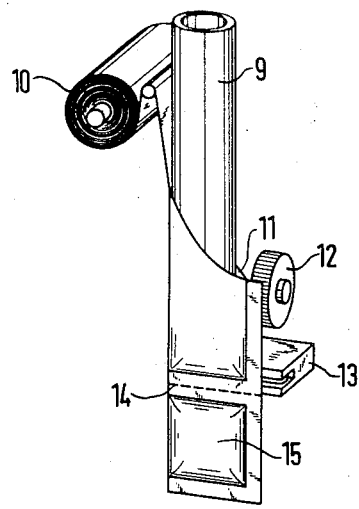
FIG. 7 is a detailed showing of the heat sealing unit used in the apparatus of FIG. 6.

The actual packaging machine is illustrated on an enlarged scale in FIG. 7. A film sheet, fashioned as a composite film according to this invention, is reeled up on a storage reel 10 and is formed into a hose around the filling pipe 9, which hose can be seen at 11. This hose is sealed along its open longitudinal edge by the heat sealing device 12. In this connection, it is also possible to use another conventional sealing device which, however, must ensure a tight seal. The lower end of the filling pipe 9 extends into the tube formed, and the mass fed via the filling pipe now flows into this tube under pressure. At the same time, a heat sealing unit 13 is provided which, in the illustrated embodiment, is fashioned as a welding unit operated by a high frequency current. Using this welding unit, the tube is heat sealed at right angles to its longitudinal axis wherein the single or double weld seam obtained forms the bottom of the bag to be filled, but simultaneously provides the seal for the filled bag. In the case where a welding unit is used which produces a double weld seam, it is possible to form simultaneously a perforating or parting line 4 between the two weld seams produced, which line makes it possible to separate the individual filled bags 15 from one another. The filled bags 15 are discharged via the conveyor belt 16 illustrated in FIG. 6.

In the drawing, the heat sealing units 12 and 13 are shown only singly, although there are, of course, corresponding brackets or twin heat sealing devices which operate toward each other.

The means furthermore required for conveying the film are likewise not shown in the drawing for reasons of clarity, since these means are known and have been employed in various automatic packaging machines.

According to the invention, the film sheet consists of a compound film wherein one film, due to its chemical properties, is essentially diffusion-proof with respect to the filling material, and the other film is well suitable for heat sealing due to its chemical properties. In this connection, the readily heat sealable film is preferably disposed on the inside in the tube formed and the diffusion-proof film is provided on the outside of this tube. The use of additional film webs in order to produce, in this manner, an even stronger composite film is, of course, within the scope of the present invention.

DESCRIPTION OF THE PREFERRED EMBODIMENTS

The multiple-layer laminates or composite films used in accordance with this invention are surprisingly resistant to solvents, i.e. they allow practically no solvent vapors at all to diffuse toward the outside. This could not be foreseen, since polyalkylene films, though substantially resistant to organic solvents, permit these solvents to diffuse to a great extent. In accordance with the present invention, the polyalkylene film serves as the inner film coming into direct contact with the filling material containing the solvent. Such films exhibit a low softening and melting point. In the case of a polyethylene film, for example, this point ranges between 110° and 140° C. Consequently, a heat sealing of the composite film employed according to this invention is possible at merely the softening point of the polyalkylene layer. This ensures that the packaged material is not overheated and no excessively high vapor pressure of the solvents is produced. Only the selection of a film to be heat sealed at temperatures of below 140° C makes it possible to provide the necessary equipment of the packaging machine in the prescribed explosion-protected design. Thus, the polyalkylene film serves as the safety layer during the heat sealing of the filled bag.

The composite films employed according to this invention can be shaped into bags and filled, in special packaging machines, with the viscous, particularly highly viscous or pasty masses containing the organic solvents, and then can be heat sealed. The material filled into the sealed bag or into the sealed package remains practically unchanged in its original consistency. There occurs practically no weight loss and thickening as a consequence of solvent diffusion. Also the known disadvantages occurring in the case of packaging in sheet metal cans are eliminated when using the composite films of this invention as the packaging material. In order to use a composite film package according to this invention, it is merely necessary to cut away one corner thereof. By simple pressure, a desired quantity of the filled-in composition can be dispensed. After use, the film can again be sealed in an airtight manner in any desired way, for example by folding over. This is not the case in the conventional sheet metal cans. Thereby, the range of application of the film package is considerably broadened.

The composite films employed according to this invention consist of an intimate bond of at least two individual films, one of which is a polyalkylene film and the other of which is a polyamide film. However, in many cases, a composite film is preferably employed wherein the two individual films of polyalkylenes and polyamide are additionally joined, on the polaymide layer, with further individual films. Such additional films are preferably aluminum foils, the outside of which is protected by an additional film. Thus, a preferred multiple-layer laminate can be constructed, for example, of a polyalkylene film, a polyamide film, an aluminum foil, and a cellophane film, wherein the polyalkylene film is always in direct contact with the filled-in composition containing organic solvents. The cellophane film can also be omitted. However, such film is suitable as the outer protective layer for the aluminum foil. In place of the cellophane film, it is also possible to employ any other desired film or another cover coating, such as a varnish layer, for example. The aluminum foil can also be imprinted on the outside with illustrations and/or letter symbols. Surprisingly, even the composite film containing the aluminum foil is heat sealable, although aluminum, as generally known, cannot be heat sealed per se. The aluminum foil has a preferred layer thickness of 5 – 35 microns and a useful thickness of 15 to 20 microns. The polyalkylene film has a preferred thickness of 10 to 60 microns and a useful thickness of 25 to 30 microns. The polyamide film has a preferred thickness of 20 to 25 microns and a useful thickness of 5 to 50 microns. The individual films can also be joined in any other desired manner, such as during the manufacturing process by the common shaping of the plastic starting materials into films. The state of the art of combining polyamide films with polyolefin films is disclosed in U.S. Pat. No. 3,423,231 of Lutzmann, dated Jan. 21, 1969.

The multiple-layer laminates or composite films employed according to this invention are suitable for the reception of viscous, particularly highly viscous, viscid, or pasty compositions containing organic solvents. Among this group are, especially, pigmented and/or filled or unpigmented coating substances of a high viscosity, such as, for example, mastics, fillers, sealing compounds, and putty-like masses based upon oils, copal, alkyd resins, nitrocellulose, unsaturated masses based upon oils, copal, alkyd resins, nitrocellulose, unsaturated polyester resins, polyurethanes, epoxy resins, as well as, quite generally, all customary varnish binders. Furthermore, suitable for use herein are synthetic or natural rubber-containing, bitumen-containing, or tar-containing masses. Furthermore, suitable are glue mastics, emulsion and dispersion mastics, as well as pasty masses based on organosols and plastisols. Likewise usable are compositions highly filled with metallic powders, such as, for example, zinc dust paints. The organic solvents contained in the compositions are normally water-insoluble; however, it is possible to include proportions of water-miscible solvents.

In the example set forth below, the advantages of the multiple-layer laminates of this application are demonstrated in comparison to conventional films.

EXAMPLE

For comparison purposes, the following films were selected:

A = composite film of a polyamide film and a polyethylene film, total thickness: 0.075 mm.

B = composite film of a polyamide film, a polyethylene film, an aluminum foil; total thickness of polyamide + polyethylene layer: 20-25 g./m²; thickness of the aluminum foil: 0.012 mm.

C = composite film of polyamide film, polyethylene film, aluminum foil, cellophane film; thickness of polyamide + polyethylene layer: 20-50 g./m²; thickness of the aluminum layer: 0.015 mm.

D = polyethylene film of a thickness of 0.20 mm.

E = composite film of polyethylene and polyester film; total thickness: 0.20 mm.

F = polyethylene film of a thickness of 0.25 mm.

Each type of film, from A to F, was formed into bags by means of a film sealing machine and filled with respectively 250 g of the following types of mastic:

I. painter's mastic based on copal stand oil,
II. nitrocellulose combination mastic,
III. synthetic resin mastic based on alkyd resins,
IV. polyester mastic based on unsaturated polyesters and polymerizable monomers, and then heat sealed in an airtight manner. The sealed bags were subjected to a storage test at either:
a. room temperature between 19° and 22° C, or
b. 30° C.

After respectively 2, 4, 6, 8 and 10 weeks, the bags were weighed and the weight loss ascertained. In the Table set out below, the mean values of the weight loss of respectively several bags are set forth in percent of weight loss.

It can be seen from the Table that the films A, B and C are clearly superior to the films D, E and F. Even after a storage period of ten weeks, no marked reduction in weight can be observed.

TABLE

I. Painter's Mastic

| Film | Storage temp. | Weight loss in percent after— | | | | |
|---|---|---|---|---|---|---|
| | | 2 weeks | 4 weeks | 6 weeks | 8 weeks | 10 weeks |
| A | a | 0.15 | 0.40 | 0.69 | 0.85 | 1.03 |
| | b | 0.22 | 0.42 | 0.63 | 0.88 | 1.10 |
| B | a | 0.02 | 0.02 | 0.02 | 0.03 | 0.04 |
| | b | 0.02 | 0.03 | 0.03 | 0.04 | 0.05 |
| C | a | 0.01 | 0.02 | 0.03 | 0.03 | 0.04 |
| | b | 0.02 | 0.03 | 0.05 | 0.08 | 0.09 |
| D | a | 0.69 | 1.42 | 2.11 | 2.62 | 3.30 |
| | b | 0.98 | 1.94 | 2.72 | 3.46 | 4.30 |
| E | a | 0.16 | 0.84 | 1.26 | 1.77 | 2.32 |
| | b | 0.25 | 0.92 | 1.84 | 2.63 | 3.31 |
| F | a | 0.62 | 1.20 | 1.78 | 2.30 | 2.84 |
| | b | 0.68 | 1.29 | 1.84 | 2.52 | 3.14 |

II. Nitrocellulose Combination Mastic

| Film | Storage temp. | Weight loss in percent after— | | | | |
|---|---|---|---|---|---|---|
| | | 2 weeks | 4 weeks | 6 weeks | 8 weeks | 10 weeks |
| A | a | 0.18 | 0.43 | 0.64 | 0.74 | 0.82 |
| | b | 0.20 | 0.46 | 0.65 | 0.78 | 0.90 |
| B | a | 0.04 | 0.15 | 0.25 | 0.39 | 0.49 |
| | b | 0.06 | 0.16 | 0.29 | 0.42 | 0.52 |
| C | a | 0.01 | 0.01 | 0.01 | 0.02 | 0.02 |
| | b | 0.02 | 0.05 | 0.15 | 0.23 | 0.30 |
| D | a | 1.99 | 3.62 | 5.22 | 6.80 | 8.24 |
| | b | 2.14 | 3.80 | 5.65 | 7.40 | 9.10 |
| E | a | 1.90 | 3.55 | 5.05 | 6.70 | 7.98 |
| | b | 2.04 | 3.72 | 5.34 | 7.00 | 8.87 |
| F | a | 1.82 | 3.30 | 4.92 | 6.48 | 7.99 |
| | b | 2.00 | 3.72 | 5.62 | 7.30 | 8.92 |

III. Synthetic Resin Mastic

| Film | Storage temp. | Weight loss in percent after— | | | | |
|---|---|---|---|---|---|---|
| | | 2 weeks | 4 weeks | 6 weeks | 8 weeks | 10 weeks |
| A | a | 0.07 | 0.09 | 0.09 | 0.10 | 0.10 |
| | b | 0.08 | 0.10 | 0.11 | 0.12 | 0.12 |
| B | a | 0.00 | 0.00 | 0.02 | 0.03 | 0.03 |
| | b | | 0.02 | 0.02 | 0.03 | 0.03 |
| C | a | 0.01 | 0.01 | 0.01 | 0.01 | 0.01 |
| | b | 0.01 | 0.02 | 0.02 | 0.02 | 0.03 |
| D | a | 0.60 | 1.08 | 1.51 | 2.03 | 2.52 |
| | b | 0.75 | 1.40 | 2.08 | 2.73 | 3.38 |
| E | a | 0.44 | 0.83 | 1.32 | 1.63 | 2.04 |
| | b | 0.58 | 1.22 | 1.84 | 2.40 | 2.98 |
| F | a | 0.48 | 0.90 | 1.22 | 1.68 | 2.00 |
| | b | 0.60 | 1.20 | 1.72 | 2.30 | 2.92 |

IV. Polyester Mastic

| Film | Storage temp. | Weight loss in percent after— | | | | |
|---|---|---|---|---|---|---|
| | | 2 weeks | 4 weeks | 6 weeks | 8 weeks | 10 weeks |
| A | a | | | | 0.02 | 0.03 |
| | b | | 0.01 | 0.02 | 0.02 | 0.03 |
| B | a | 0.02 | 0.02 | 0.02 | 0.02 | 0.02 |
| | b | 0.02 | 0.02 | 0.03 | 0.03 | 0.03 |
| C | a | | 0.01 | 0.01 | 0.01 | 0.01 |
| | b | | 0.01 | 0.02 | 0.02 | 0.03 |
| D | a | 0.84 | 1.62 | 2.40 | 3.20 | 4.03 |
| | b | 0.85 | 1.65 | 2.50 | 3.40 | 4.12 |
| E | a | 0.77 | 1.62 | 2.31 | 3.14 | 3.82 |
| | b | 0.83 | 1.70 | 2.58 | 3.45 | 4.15 |
| F | a | 0.72 | 1.40 | 2.10 | 2.78 | 3.46 |
| | b | 0.78 | 1.59 | 2.40 | 3.18 | 3.83 |

I claim:

1. A flexible laminated package enclosing highly viscous or pasty compositions comprising a laminated system consisting of two layers, the inner layer being polyalkylene film heat sealable at a temperature between 110° and 140° C with a layer thickness of 10–60 microns, the outer layer of the system being a diffusion proof polyamide film with a layer thickness of 5–50 microns, said package containing in contact with its inner layer of polyalkylene said highly viscous or pasty compositions containing organic solvents.

2. A flexible laminated package enclosing highly viscous or pasty compositions comprising: a laminated system consisting of an inner layer being a polyalkylene film heat sealable at a temperature between 110° and 140° C with a layer thickness of 10–60 microns, an outer layer of the system being a diffusion proof polyamide film with a layer thickness of 5–50 microns, an additional aluminum foil bonded on the outer layer of said polyamide film, said aluminum foil having a layer thickness of 5–35 microns, said package containing in contact with its inner layer of polyalkylene said highly viscous or pasty compositions containing organic solvents.

3. The flexible laminated package of claim 2, further comprising a protecting film, bonded to the outer surface of said aluminum foil.

4. The flexible laminated package of claim 2, wherein said polyamide film is selected from the group consisting of Nylon 6, Nylon 6—6, Nylon 3, Nylon 4, Nylon 7, Nylon 8, Nylon 9, Nylon 10 and Nylon 11.

5. The flexible laminated package of claim 4, wherein said polyalkylene film is selected from the group consisting of polyethylene, polypropylene, polyisopropylene, polybutylene and polyisobutylene.

6. The flexible laminated package of claim 5, wherein said polyalkylene film, said polyamide film and said aluminum foil are cemented together.

7. The flexible laminated package of claim 5, wherein said polyalkylene film is polyethylene.

* * * * *